United States Patent [19]

Fayard

[11] Patent Number: 4,973,076

[45] Date of Patent: Nov. 27, 1990

[54] DEVICE FOR ADJUSTING THE CAMBER ANGLE OF A VEHICLE

[75] Inventor: Jean-Claude Fayard, Lyon, France

[73] Assignee: Elf France, Courbevoie, France

[21] Appl. No.: 379,347

[22] Filed: Jul. 13, 1989

[30] Foreign Application Priority Data

Jul. 18, 1988 [FR] France .................. 88 09686

[51] Int. Cl.⁵ .................. B62D 17/00; B62D 7/06
[52] U.S. Cl. .................. 280/661; 280/675
[58] Field of Search .................. 280/661, 675

[56] References Cited

U.S. PATENT DOCUMENTS

| | | | |
|---|---|---|---|
| 2,115,256 | 4/1938 | Eckenrode | 280/96.1 |
| 2,828,969 | 4/1958 | Hoffman | 280/661 |
| 4,796,720 | 1/1989 | Bauer | 180/234 |
| 4,819,959 | 4/1989 | Inoue et al. | 280/661 |
| 4,842,296 | 6/1989 | Kubo | 280/661 |

FOREIGN PATENT DOCUMENTS

| | | |
|---|---|---|
| 0246116 | 11/1987 | European Pat. Off. . |
| 940482 | 12/1948 | France . |
| 1082796 | 1/1955 | France . |
| 2082521 | 12/1971 | France . |
| 59-118514 | 7/1984 | Japan . |

Primary Examiner—Kenneth R. Rice
Attorney, Agent, or Firm—Oblon, Spivak, McClelland, Maier & Neustadt

[57] ABSTRACT

The present invention relates to a device for adjusting the camber angle of the wheel of a vehicle, the rotary axle of which is mounted on the hub carrier (12), at least one of the ends of which is movable in terms of a shift relative to a vertical plane passing through the axis of symmetry of the wheel, characterized in that this end is mounted in an eccentric movable in rotation on one of the fastening points of the arm (12) on a suspension device of the wheel (10, 11), the eccentric being driven in rotation as a function of the angle of lock of the wheels or of the suspension height.

14 Claims, 10 Drawing Sheets

FIG_1

FIG_2

FIG_14

FIG_15A

FIG_15B

FIG_15C

FIG_16A

FIG_16B

DEVICE FOR ADJUSTING THE CAMBER ANGLE OF A VEHICLE

The present invention relates to a device for adjusting the camber angle of a vehicle.

Figure 6:
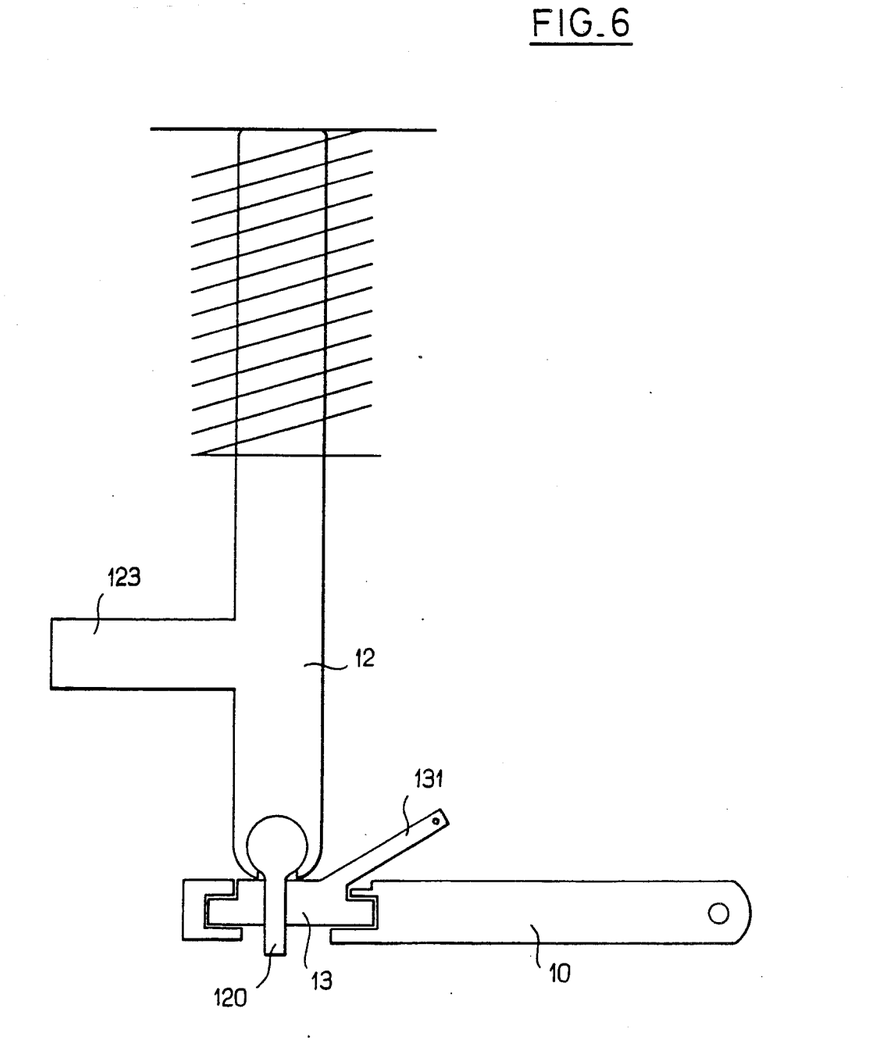
FIG. 6 shows a front view of a suspension of the MacPherson type equipped with an adjusting device according to the invention.
Figure 9A:
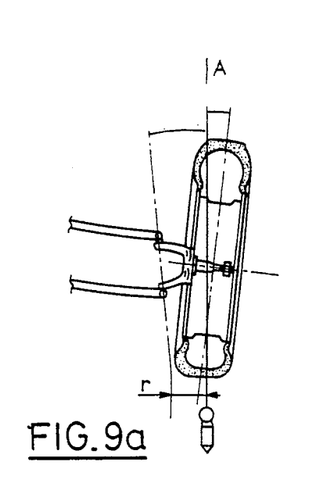
FIG. 9A shows the camber angle.
Figure 9B:
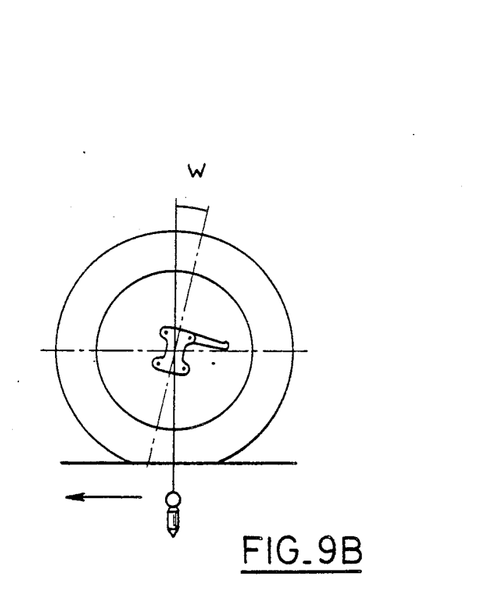
FIG. 9B shows the caster angle.

In modern vehicles equipped either with a suspension of the MacPherson type (FIG. 6) or with a double-triangle suspension (FIG. 1), the camber angle of the leading wheels has an important bearing on the behaviour of the vehicle. On most vehicles, this angle is either zero or is always very small and made positive or negative. For the sake of clarity, we would recall that the camber angle is the acute angle (A in FIG. 9) which a vertical line forms with the mid-plane of the wheel. This angle is called negative when the axis of the wheel relative to the vertical returns to the inside. This angle is called positive when, conversely, the axis of the wheel moves away from the vertical, as shown in FIG. 9. FIG. 9B illustrates the caster angle (W). This angle (W) is the angle which the pivot axis of the stub of a wheel forms with a vertical line. If the line of the pivot axis relative to the bearing plane is located in front of the centre of the contact surface of the type, it is said that there is a positive caster. Otherwise, there is a negative caster. In vehicles of the prior art, the aim is to obtain the best compromise between the camber angle and the caster angle. This compromise must make it possible to minimise the disadvantages, such as abnormal wear of the tires, instability of the vehicle, unpleasant sensations during motoring or reaction effects in the steering wheel. Thus, in general, the camber angle is positive on private vehicles and negative on very fast sports vehicles.

The object of the present invention is to avoid this type of compromise and provide a device for adjusting the camber angle which makes it possible to maintain an ideal contact surface between the tire and the ground.

This object is achieved because the device for adjusting the camber angle of the wheel of a vehicle, the rotary axle of which is mounted on a hub carrier, at least one of the ends of which is movable in terms of a shift relative to a vertical plane passing through the axis of symmetry of the wheel, this end being mounted in an eccentric movable in terms of rotation relative to one of the fastening points of the arm on the suspension device of the wheel, the eccentric being driven in rotation as a function of the angle of lock of the wheels.

Thus, the camber angle of the leading wheels varies as a function of the radius of lock, in order to maintain an ideal contact surface between the tire and the ground.

Another object of the invention is to provide a device suitable both for a double-triangle suspension device and for a MacPherson-type device.

According to a first feature, this object is achieved because the movable end of the hub carrier is the upper point of a double-triangle suspension, an actuating lever connected to the steering rack causes a rotation of the wheel hub, and a link connected to the steering rack controls the rotation of the eccentric in a direction opposite to that of the hub carrier.

According to another feature, the upper pivot axle of the hub carrier is mounted offset towards the inside of the vehicle in relation to the axis of symmetry of the eccentric, in which the axis of rotation of the hub carrier is offset.

According to another feature, the lower pivot axle of the hub carrier is mounted offset, for example, on a double-triangle suspension or a MacPherson-type suspension, towards the outside of the vehicle in relation to the axis of symmetry of the eccentric, in which the axis of rotation of the hub carrier is offset; the actuating lever connected to the steering rack causes the rotation of the wheel hub, and a link connected to the steering rack controls the rotation of the eccentric in the same direction as the hub.

Another object of the invention is to make it possible to change the camber angle of the rear wheels as a function of the angle of lock.

This object is achieved because transmission means between the control of the lock of the front wheels changes the camber angle of the rear wheels as a function of this angle of lock.

According to another feature, these transmission means are hydraulic, pneumatic, electrical or mechanical.

A final object of the invention is to provide a device for adjusting the camber angle, making it possible to take into account the movements of the suspension of the vehicle or the speed of the latter.

This last object is achieved because the position of the eccentric is changed as a function either of the vehicle suspension movements or of the speed of the vehicle or of a combination of these parameters.

According to another feature, the eccentric is arranged on the axis of rotation of the lower or upper triangle supporting the hub carrier.

Other features and advantages of the present invention will emerge more clearly from a reading of the following description made with reference to the accompanying drawings in which.

Figure 1:
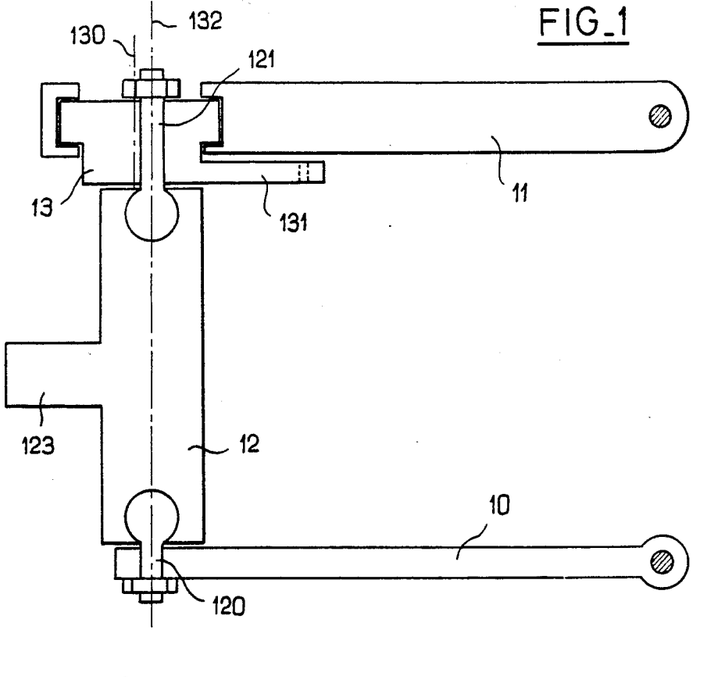
FIG. 1 shows a front view of a front righthand chassis assembly of a vehicle with a double-triangle suspension, equipped with a according to the invention.
Figure 2:
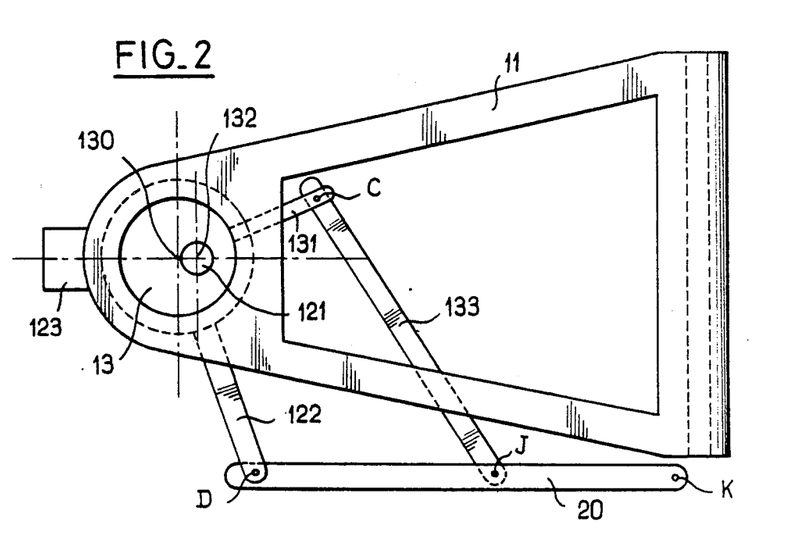
FIG. 2 shows a top view of the device of the invention equipping a double-triangle suspension.

As shown in FIGS. 1 and 2, the principle of the invention involves equipping one of the triangles of a double-triangle suspension with an eccentric device (13). The double-triangle suspension (10, 11) supports the hub carrier (12), the lower end (120) of which is mounted pivotably on the lower triangular arm (10). The upper end (121) of the hub carrier (12) is mounted pivotably about an offset axis (132) in a piece (13) forming an eccentric. This piece (13) is mounted pivotably in the upper triangular arm (11), so as to rotate about its axis of rotation (130). The rotational movement of the cylindrical piece (13) about its axis (130) is controlled by a lever (131) which is integral with the cylindrical piece (13) and the free end of which is itself connected to a second lever (133). The second end of this lever (133) is fixed to a link (20) by means of a point of articulation (J). This point (J) is located between the two ends of this link. A first end of the link (20) is fixed to the steering rack at a point of articulation (K), whilst the second end of this link (20) is articulated at a point (D) on one end of a lever (122), the other end of which is integral with the hub-carrier arm (12).

The functioning of the device described will be explained by means of FIGS. 3, 4 and 5 which show the positions of the various elements as a function of the different angles of lock for a front left-hand halfchassis of a vehicle.

Figure 4:
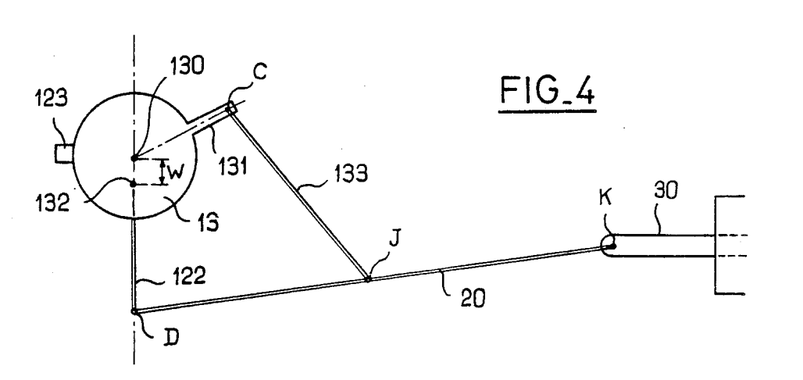

In FIG. 4, the wheels are straight and the camber angle is zero. In fact, the axis of symmetry (132) of the hub carrier (12) is contained in the longitudinal plane parallel to the wheel and passing through the centre of symmetry of the cylindrical piece (13). The lengths of the levers (133, 122, 131) and of the link (20) and the fastening points (C, J, D) are provided in such a way that, when the rack is in its neutral position (without lock), the axis of the eccentric device and the axis of symmetry of the arm (12) are in a plane parallel to the direction of advance of the vehicle.

Figure 3:
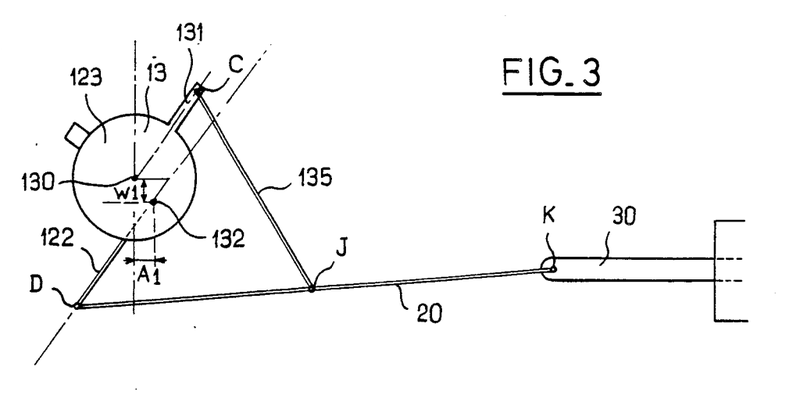
FIGS. 3 to 5 show diagrammatically the different positions occupied by the device of the invention in the three possible lock positions of a front left-hand chassis assembly.

In FIG. 3, the wheels are locked to the right, the hub (123) has been driven in rotation in the clockwise direction by the lever (122) connected to the end of the link (20) associated with the steering rack, and the lever (131) controlling the rotation of the eccentric piece (13) has been driven in the anti-clockwise direction by the lever (133) connected to the point (J) on the link (20). The axis of symmetry (132) of the arm (12) has been shifted in rotation in the opposite direction to the direction of rotation of the hub (23). This axis (132) is on the right of the axis of symmetry (130) of the eccentric (13) and causes a negative camber of the wheel. As can be appreciated, the negative camber angle increases progressively with the radius of lock. Likewise, as may be appreciated from FIG. 7, at the same time, since the right-hand end (31) of the steering rack has experienced a movement tending to cause the link (31) to retract into the rack housing (3), the front right-hand half-chassis undergoes an opposite movement giving the front right-hand wheel a positive camber.

Figure 5:
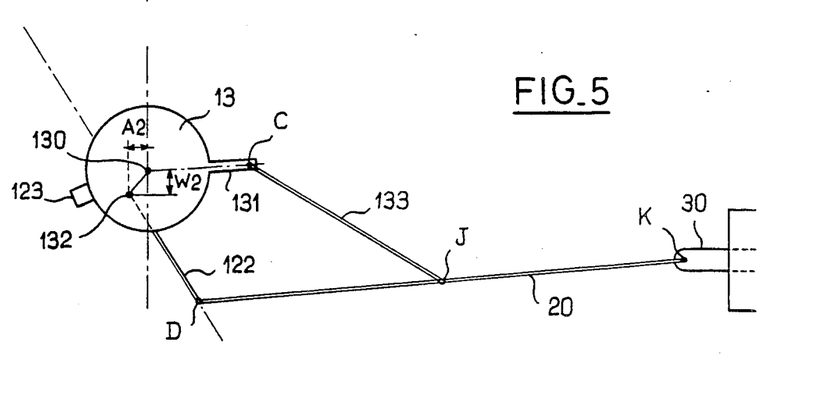

FIG. 5 shows the kinematics of the movement for a locking of the wheels to the left. Conversely to FIG. 3, the axis of symmetry (132) of the hub carrier (12) is located on the left of the longitudinal axis (130) of the suspension, and this arrangement causes a positive camber of the left front wheel. Likewise, in this configuration with a lock to the left, the right front wheel will assume a negative camber, since, in this case, the link (31) will come out of the rack housing (3) to a greater extent and will shift the point of articulation (D) beyond the plane of symmetry of the suspension and outwards. Furthermore, as can be seen from FIGS. 3 to 5, the variation of the camber (A1, A2) causes a substantial variation of the caster angle between the values (W), (W1), (W2). Thus, the caster angle (W) decreases when the radius of lock increases. This variation of the caster angle can be reversed by means of symmetrical assembly. It is clear that the connection point (J) between the lever (133) and the line (20) for connection to the steering rack (30) can be shifted in order to vary the camber angle obtained for a given radius of lock, so as to adjust this camber angle according to the characteristics of the suspension.

Likewise, the description has been made with regard to a device located in the upper triangle of the suspension, but it is clear that the device could fit into the lower triangle of the suspension, if the kinematics were reversed in order to obtain the same variations of the camber angle as a function of the locks. Thus, the mounting of the eccentric in the lower arm (10) is especially advantageous with regard to a suspension of the MacPherson type shown in FIG. 6. In this arrangement, it is the shift of the lower axle (120) of the hub carrier (12) which, as a result of the rotation of the eccentric (13), changes the camber angle as a function of the radius of lock. In this arrangement, to obtain a negative camber angle, the axis of symmetry (20) of the hub carrier (12) must be located on the left of the axis of symmetry (130) of the eccentric (13), and the levers (131) and (122) must rotate in identical directions of rotation to ensure that the camber increases with the lock. For front chassis assemblies with double triangulation, the device can be mounted equally on the lower axle (120) or upper axle (121) of the hub carrier (12). One mounting arrangement or the other will be chosen according to the simplicity of the embodiment which it produces.

Figure 7:
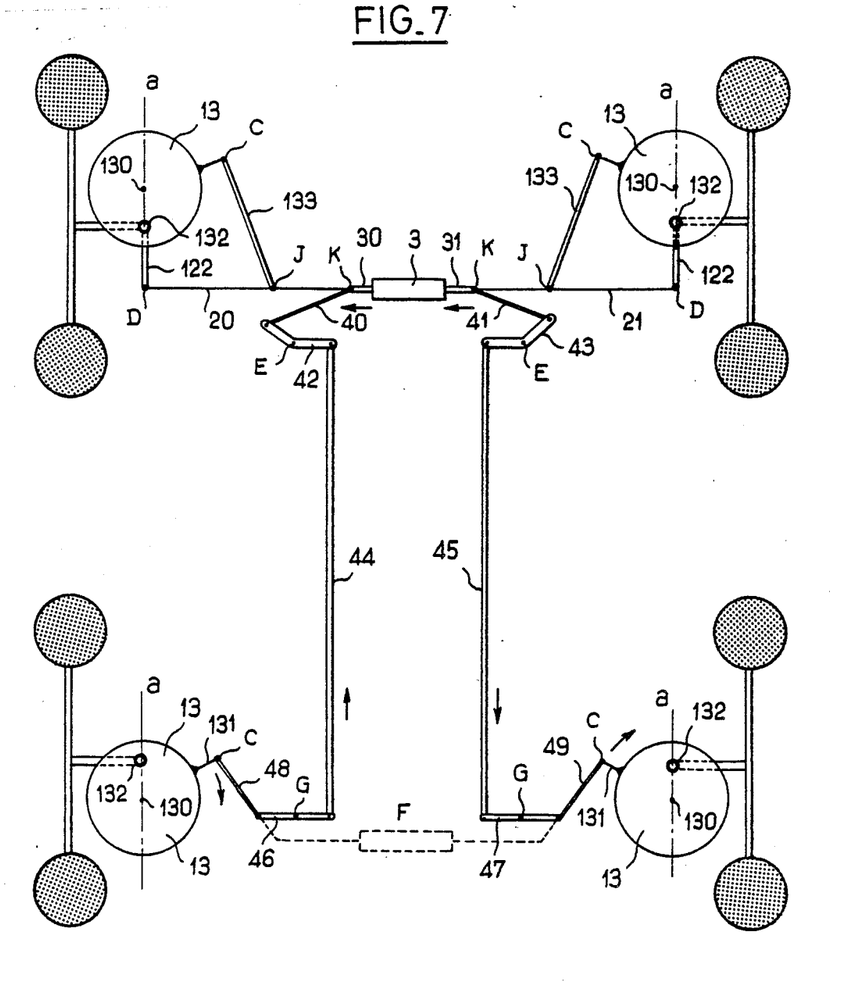
FIG. 7 shows a diagrammatic view of a vehicle equipped, on its four wheels with devices for correcting the camber angle according to the invention.

FIG. 7 illustrates a device for varying the camber of the front and rear wheels of a vehicle. The left output (30) of the rack (3) is connected by means of a rod (40) to a bar (42) articulated at its centre about a point (E). The second end of this rod (42) is connected to a rod (44) for transmitting the movement to a link (46) pivoting about a centre point (G). The second end of this link (46) is connected to a link (48) articulated at its point (C) on the end of the lever (131), in order to cause the rotation of the eccentric (13) of the left rear wheel. Likewise, the right end (31) of the rack (3) is connected by means of a rod (41) and a pivoting lever (43) to a transmission rod (45). This rod (45) is connected to one end of a lever (47) pivoting about a point (G), the other end of which controls a rod (49) which is itself connected to the point of articulation (C) of the end of the control lever (131) of the eccentric (13) of the right rear wheel. As can be seen from the arrows of FIG. 7, when the rack (3) shifts so as to cause the front wheels to lock to the right, the rod (44) is shifted towards the front of the vehicle, whilst the rod (45) is shifted towards the rear. This movement causes the rotation of the left and right eccentrics in the clockwise direction. Thus, the left rear wheel follows the same variation of camber angle as the corresponding front wheel. The same applies to the right rear wheel. It will be seen that, in the arrangement of FIG. 7, the caster angle of the rear wheels is reversed in relation to the caster angle of the front wheels. In fact, the axis of symmetry (132) of the arm is located in front of the axis of symmetry (130) of the eccentric for the rear wheels.

In an alternative embodiment, the mechanical transmission system (40 to 47) can be replaced by a hydraulic, electrical or pneumatic jack (3) subject to the steering control (3) and actuating the eccentrics (13) of the rear wheels directly.

Figure 8:
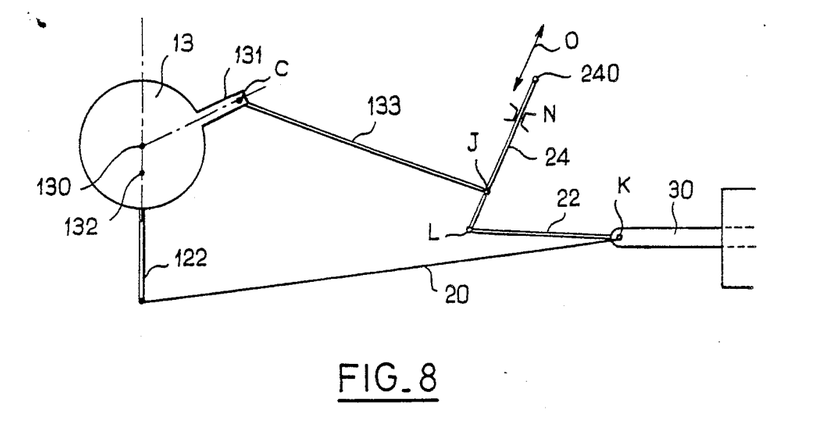
FIG. 8 shows a diagrammatic view of a device taking into account the speed of the vehicle in order to vary the camber angle.

FIG. 8 shows a rather more sophisticated embodiment, in which the variations of the camber are controlled by a hydraulic or electrical system governed by the speed of the vehicle. This additional control thus makes it possible to increase or decrease the variation of the camber with the speed. In this Figure, identical elements bear the same references. A bar (24) is mounted slideably or relative to the vehicle body. This bar (24) is controlled at its end (240) by a hydraulic or electrical device, the movements of which take place as a function of the speed of the vehicle. The point of articulation (J) of the control rod (133) of the eccentric (13) is located on the rod (24), the second end (L) of which is articulated on a bar (22) which is itself connected to the point of articulation (K) of the end (30) of the rack (3). When the speed of the vehicle is constant, the point (J) describes a curve homothetic relative to that described by the point (L) when the wheels are locked. When the speed varies, the homothetic ratio changes. Thus, by shifting the rod (24), the amount of movement of the rod (133) is varied as a function of the movement of the point (K) of the end of the rack (30). This system therefore makes it possible to change the rotation of the eccentric (13) as a function of a parameter, such as the speed of the vehicle. Other parameters could also be taken into account, such as, for example, the load of the vehicle or any other element which can have an effect on the vehicle compartment.

Figure 10:
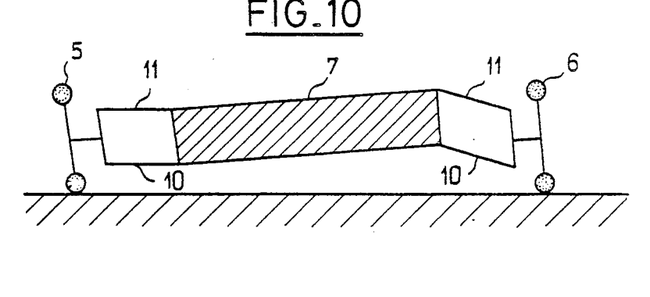
FIG. 10 shows diagrammatically the behaviour of the suspension and of the wheels of a vehicle subjected to a rolling motion.

FIG. 10 shows diagrammatically a vehicle body (7) connected by means of the articulation arms (11, 10) to each of the wheel assemblies (5, 6). This vehicle equipped with a conventional triangulated suspension is subjected to a rolling motion. In this case, the wheels assume a large camber angle relative to the ground, in the wrong direction. This therefore reduces the grip of the tires.

Figure 11:
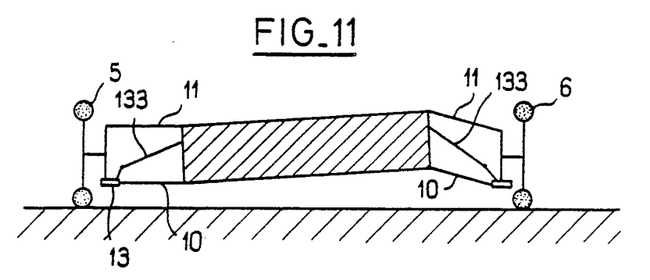
FIG. 11 shows the behaviour of the same vehicle subjected to the same rolling motion when the latter is equipped with a device for varying the camber angle according to the invention.
Figure 12:
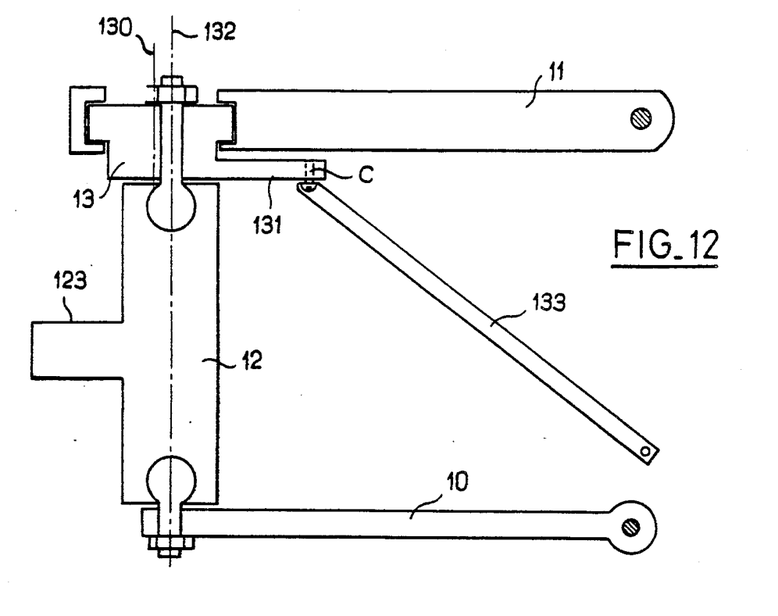
FIG. 12 shows a front view of a device for correcting the camber angle as a function of the movements of the suspension.

FIGS. 11 and 12 show an example of the application of the invention to the above problem. In this FIG. 11, the same vehicle (7) equipped with a triangulated suspension (10, 11) is equipped with an eccentrictype camber corrector. The eccentric is controlled by a link (133) fastened to the chassis at a fastening point near the fastening point of the triangle (10) opposite that (11) incorporating the eccentric (13). The variations of suspension height change the distance between the eccentric and the fixed point, and the link (133) of set length drives the end (131) of the eccentric (13) in rotation.

The variation of the camber with the suspension height can advantageously be combined with the correction as a function of the angle of lock on the leading wheels by means of a system similar to that described in conjunction with FIG. 8. In this case, the slide (24) can be controlled by the suspension height and as a function of the compression of the suspension will change the amount of the variations of the camber during the lock.

Figure 13A:
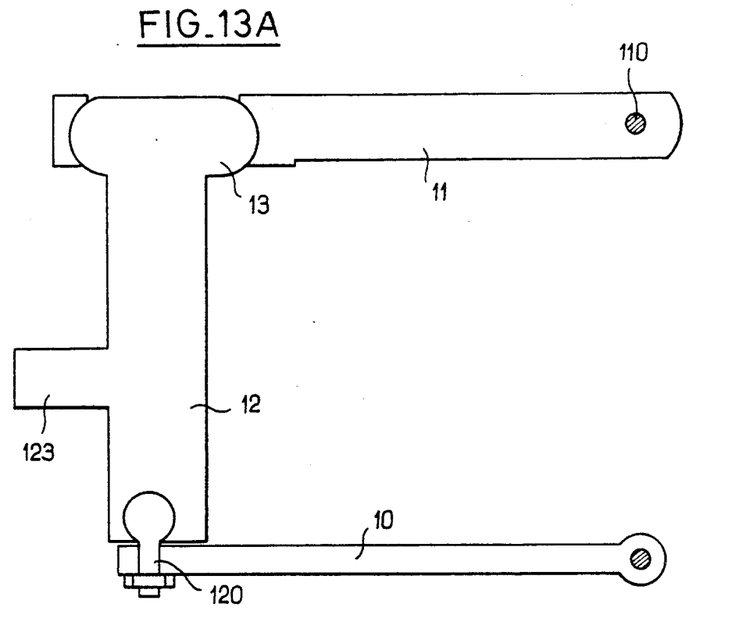
FIG. 13A shows an alternative embodiment of the invention in which the eccentric is integral with the hub carrier.
Figure 13B:
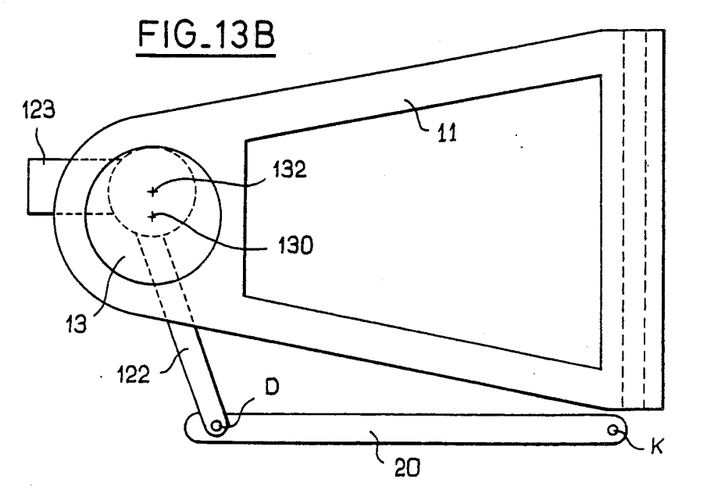
FIG. 13B is a top view of the alternative embodiment illustrated in FIG. 13A.
Figure 15A:
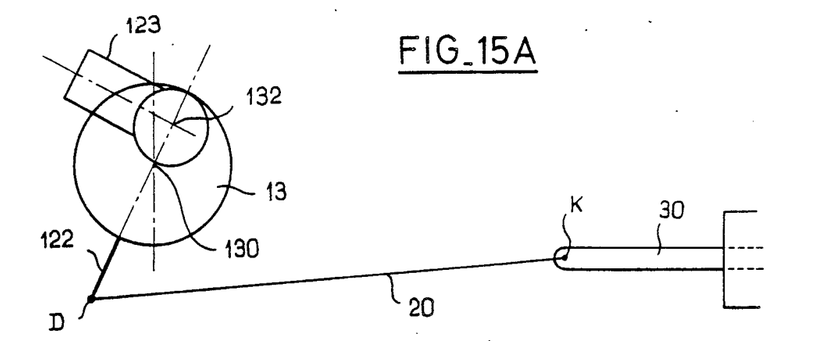
FIGS. 15A, 15B and 15C show diagrammatically the different positions occupied by the alternative version in the three possible lock positions of a front left-hand chassis assembly.
Figure 15B:
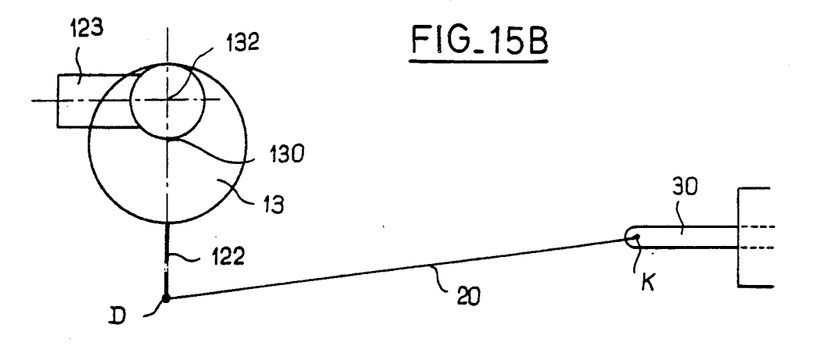
Figure 15C:
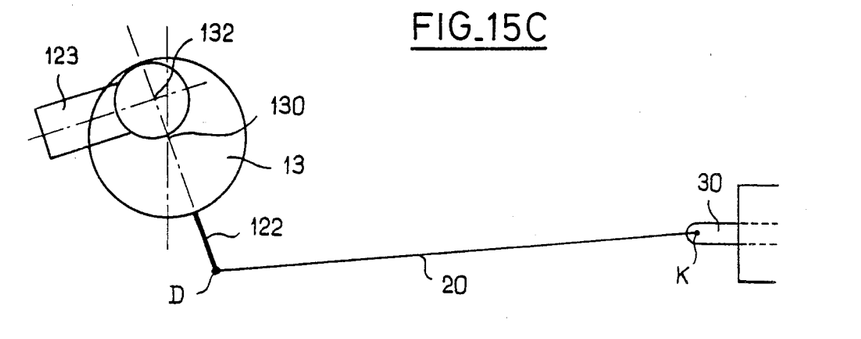

Another alternative embodiment of the invention is shown in FIG. 13A and 13B, in which the arm (12) of the hub carrier (23) is integral with the eccentric (13), in such a way that the axis of symmetry (132) of the arm is offset relative to the axis of symmetry (130) of the eccentric (13). As in the alternative version of FIG. 1, the eccentric (13) is mounted in the upper suspension triangle (11), whilst the lower end of the hub carrier (12) is mounted in the lower arm (10) by means of a pivot (120). In this alternative version, the rotation of the hub-carrier arm by means of the lever (122) at the same time causes a variation of the camber angle, as shown in FIGS. 15A to 15C. FIG. 15A corresponds to the lock of the wheels to the right, whilst FIG. 15C corresponds to the lock of the wheels to the left. Where the alternative version corresponding to FIGS. 15A to 15C is concerned, the variation of the camber angle is linked directly to the variation of the angle of lock.

In contrast, the alternative version corresponding to FIGS. 3 to 5, the variation of the camber is a function of the variation between the angle of lock and the rotation of the lever (131) integral with the eccentric (13) and consequently of the geometry of the components (122, 20, 133 and 131).

Figure 14:
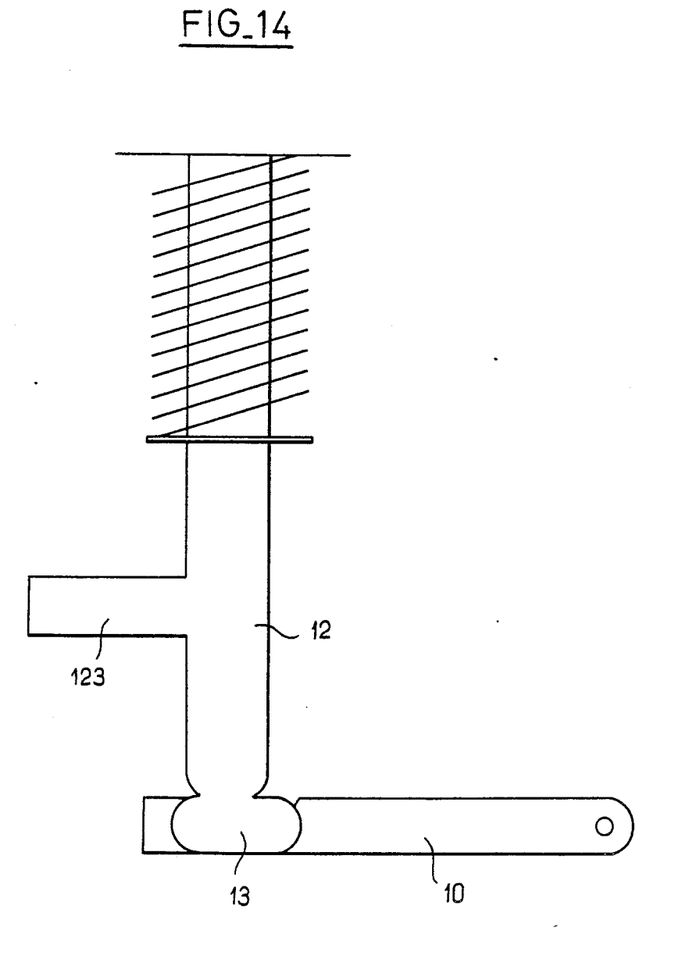
FIG. 14 shows a front view of a suspension of the MacPherson type equipped with an eccentric integral with the hub carrier.

FIG. 14 illustrates an alternative embodiment of the invention, in which the hub carrier (12) is integral with the eccentric (13), the axis of symmetry of the arm (12) being offset relative to the axis of symmetry of the piece (13). The eccentric (13) is mounted at the end of the lower suspension arm (10) of a suspension of the MacPherson type. In this alternative version, the variation of the camber is directly proportional to the angle of lock.

Figure 16A:
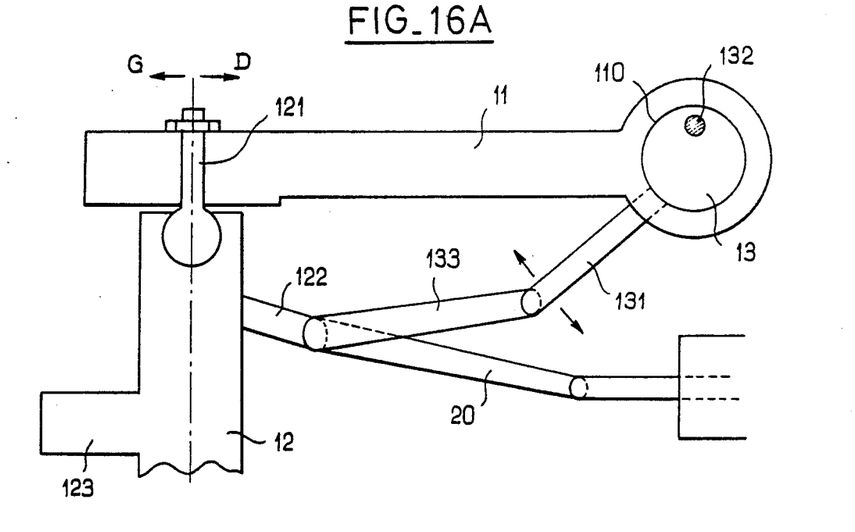
FIG. 16A shows a front view of another alternative embodiment of the invention.
Figure 16B:
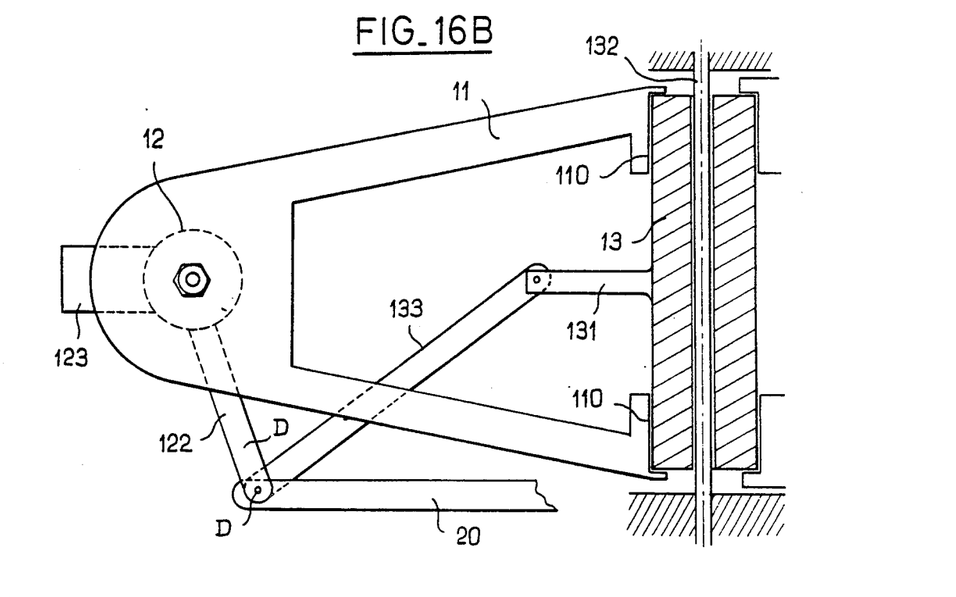
FIG. 16B shows a top view of the alternative embodiment of the invention according to FIG. 16A.

FIGS. 16A and 16B show a last alternative version of the invention, especially advantageous on competition vehicles where it is desirable to seek a minimum unsuspended weight. In this alternative version, the hub carrier (12) is mounted pivotably in terms of rotation by means of an axle (21) at the vertex of a suspension triangle (11), of which the base (110) opposite the vertex is articulated on a cylindrical piece (13) mounted movably in terms of rotation relative to the vehicle chassis on an axle (132) offset relative to the base (110) of the triangle. This piece (13) is actuated by a lever (131), itself controlled by a transmission link (133) connected at a point of articulation (D) to the control rod (20) for the locking of the wheels by means of the locking lever (122). Thus, as a function of the ratio of the links and of the levers and as a function of the angle of lock, the axis of symmetry of the rotary pivot of the hub carrier (12) is shifted to the left or to the right according to the arrows (G) or (D) of FIG. 16A. In the same way, the control of the eccentric (131) can be subject either to the radius of lock or to the suspension height or to both or also to the speed of the vehicle. In that case, the control of the eccentric (13) drives the entire triangle (11) in a movement to the left or to the right and thus produces a negative camber or a positive camber in the same way as in the preceding embodiments.

Other modifications within the scope of an average person skilled in the art also come within the spirit of the invention.

I claim:

1. Device for adjusting the camber angle of the wheel of a vehicle, the rotary axle of which is mounted on the hub carrier (12), at least one of the ends of which is movable in terms of a shift relative to a vertical plane passing through the axis of symmetry of the wheel, characterized in that this end is mounted movably in terms of a shift by means of an eccentric (13) driven in rotation as a function of the angle of lock of the wheels.

2. Device according to claim 1, characterized in that the hub carrier (12) is fixed to the eccentric (13) at one end and the axis (132) of the hub carrier (12) is offset relative to the axis of symmetry (130) of the eccentric.

3. Device according to claim 1, characterized in that the end of the hub carrier (12) is mounted movably in terms of rotation in the eccentric (13), itself mounted movably in terms of rotation on one of the fastening points of a suspension device (10, 11) of the wheel.

4. Device according to claim 3, characterized in that an actuating lever (122) causes the rotation of the hub carrier (12) of the wheel, and a link (133) connected to the steering rack (20) controls the rotation of the eccentric (13) in a direction opposite that of the hub carrier (123).

5. Device according to claim 3, characterized in that the movable end (12) of the hub carrier (12) is the upper point of a double-triangle suspension (10, 11), and the pivoting point is mounted offset towards the inside of the vehicle in relation to the axis of symmetry (130) of the eccentric (13).

6. Device according to claim 3, characterized in that the lower pivot axle (120) of the hub carrier (12) is mounted offset towards the outside of the vehicle in relation to the axis of symmetry (130) of the eccentric (13), in which the axis of rotation (120) is offset, an actuating lever (122) connected to the steering rack (20) causes the rotation of the hub carrier (12) of the wheel, and a link (133) connected to the steering rack controls the rotation of the eccentric (13) in the same direction as that of the hub carrier (123).

7. Device according to one of the preceding claims, characterized in that the position of the eccentric (13) is likewise changed as a function of a control representing the movements of the vehicle suspension.

8. Device according to one of 1–6 claims, characterized in that the position of the eccentric (13) is likewise changed as a function of a control representing the speed of the vehicle.

9. Device according to claim 8 or 9, characterized in that the control is hydraulic, pneumatic or electrical.

10. Device according to one of claims 8 or 9, characterized in that the control is provided by a rod assembly.

11. Device according to one of claims 4, 5 or 6, characterized in that transmission means (40, 49) between the control of the lock of the front wheels and of the rear wheels change the camber angle of the rear wheels as a function of the angle of lock.

12. Device according to claim 11, characterized in that the transmission means are hydraulic, pneumatic or electrical.

13. Device according to claim 11, characterized in that the transmission means are mechanical.

14. Device according to claim 1, characterized in that the eccentric (13) is mounted in the suspension triangle (10 or 11) in the region of its suspension axle.

* * * * *